United States Patent [19]

Saccone

[11] Patent Number: 4,909,620

[45] Date of Patent: Mar. 20, 1990

[54] NOVELTY SUN GLASSES WITH INFORMATION DISPLAY MEMBERS HAVING THE FORM OF MOOSE ANTLERS

[76] Inventor: Louis V. Saccone, 54 Miller Rd., Farmingdale, N.Y. 11735

[21] Appl. No.: 330,074

[22] Filed: Mar. 29, 1989

[51] Int. Cl.⁴ .............................................. G02C 11/02
[52] U.S. Cl. .................................................... 351/51
[58] Field of Search .................... 334/43, 51, 158, 111; 40/586

[56] References Cited

U.S. PATENT DOCUMENTS 3,016,796  1/1962  Booth .................................... 351/43
3,038,375  6/1962  Ganz ..................................... 351/43

Primary Examiner—Rodney B. Bovernick
Assistant Examiner—J. Ryan
Attorney, Agent, or Firm—Richard L. Miller

[57] ABSTRACT

This invention is a novelty head gear for wear by an individual and includes a pair of sunglasses having a novelty design of moose antlers attached to the sunglasses and extending sidewardly into opposite directions.

14 Claims, 1 Drawing Sheet

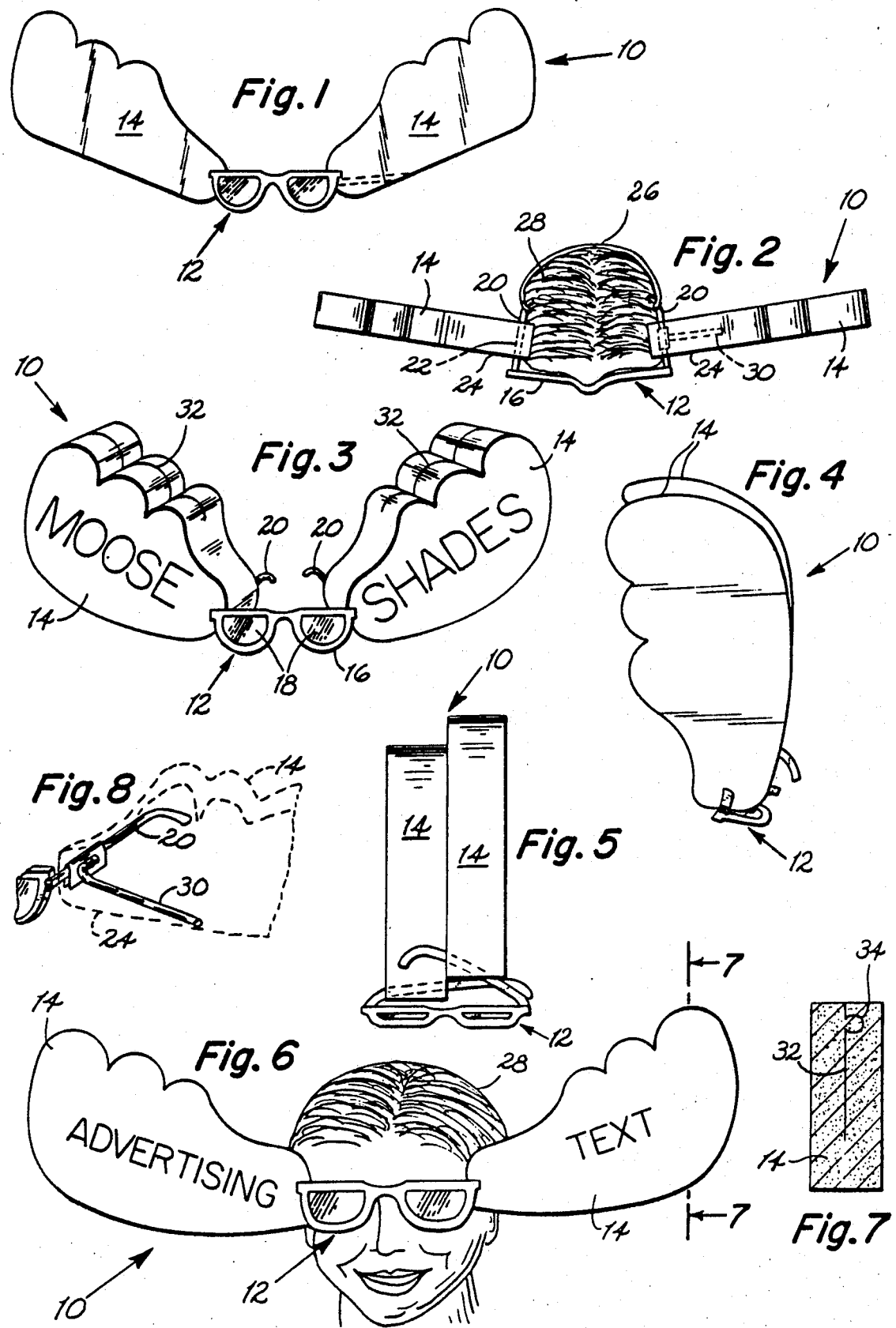

NOVELTY SUN GLASSES WITH INFORMATION DISPLAY MEMBERS HAVING THE FORM OF MOOSE ANTLERS

BACKGROUND OF THE INVENTION

The invention relates generally to eye glasses having novelties attached thereto.

It is well known that numerous eye glasses have been designed in the past having various different novelty features added on the eye glasses frame so as to appeal particularly to children and youths who find it amusing, distinctive and attractive when notice by others. Thus rims of eye glass frames have been previously patterned in color or have been made with designs of flowers or the like. However none have been design with extra large display attached thereto. For example, U.S. Pat. No. 2,023,523 to Grimball; U.S. Pat. No. 2,502,224 to Kozloff; U.S. Pat. No. 2,835,063 to Worthington; U.S. Pat. No. 2,907,138 to Kolwicz and U.S. Pat. No. 3,663,099 to Saffir all are illustrative of such prior art. While these units may be suitable for the particular purpose to which they address, they would not be as suitable for the purpose of the present invention as hereafter described.

SUMMARY OF THE INVENTION

Accordingly it is a principal object of the present invention is to provide a novelty eye glasses having a large sidewardly protruding display representing the horns or antlers of an animal so as to be certainly noticed by everybody.

Another object is to provide a novelty wherein the eye glasses comprise sunglasses and wherein the extending antlers are big like those of a moose, so that the antlers are suitable for eye-catching advertising being made thereupon.

Another object is to provide a novelty sun glasses with moose antlers that make a wearer look like a comical moose.

Yet another object is to provide a novelty sun glasses with moose antlers wherein the antlers are made of a resilient material so as to not injure other persons alongside nor damage objects located adjacent a wearer.

Other objects are to provide a novelty sun glasses with moose antlers which is simple in design, inexpensive to manufacture, easy to attach and remove from eye glasses and which are unlike from any other heretofore.

Further objects of the invention will appear as the description proceeds.

To the accomplishment of the above and related objects, this invention may be embodied in the form illustrated in the accompanying drawings, attention being called to the fact, however, that the drawings are illustrative only and that changes may be made in the specific construction illustrated and described within the scope of the appended claims.

BRIEF DESCRIPTION OF THE DRAWING FIGURES

The figures in the drawings are briefly described as follows:

FIG. 1 is a front elevational view of the invention.

FIG. 2 is a top plan view thereof showing in phantom a wire stiffener inside one of the antlers.

FIG. 3 is a front perspective view thereof.

FIG. 4 is a top plan view of the instant invention when folded as shown in FIG. 4.

FIG. 5 is a top plan view of the instant invention when folded as shown in FIG. 4.

FIG. 6 is a front view of the instant invention shown being worn by a person.

FIG. 7 is a cross sectional view taken on line 7—7 of FIG. 6 showing the foam plastic material construction.

FIG. 8 is a partial perspective view showing the detailed construction of a support member to prevent the foam antler from drooping.

DETAILED DESCRIPTION OF THE PREFERRED EMBODIMENTS

Referring now to the drawing in greater detail, the reference numeral 10 represents a novelty device according to the present invention which comprises a pair of sun glasses 12 and a pair of sidewardly comical caricatures of a moose's antlers 14. The sun glasses comprise a conventional eye glasses frame 16 fitted with sun glasses lens 18 and a pair of temple bars 20 pivotally attached together.

Each moose antler is made from a thick pad of polystyrene foam plastic or foam rubber material and is either molded or die cut into the contour as shown. As best indicated in FIGS. 2 and 3, the temple bars are inserted through transverse openings 22 across the base end 24 of the moose antlers. A head band 26 may be connected between the ends of the temple bar so as to extend around a rear of the wearer's head 28 for additional support. The words "Moose Shades" may be imprinted on a front side of the antlers. Otherwise the space is adaptable for printing any advertisement, as indicated in FIG. 6.

Due to the cantilever support of the long antlers by their one end, the weight of the other end thereof would tend to drop the antler, however this is prevented by a wire stiffener 30, shown in FIGS. 2 and 8, either fastened to the temple bar or else made integrally therewith and extending inside the antler.

As shown in FIGS. 3 and 7, a pocket 32 may be formed by a flat slit in each antler for use as a secret pocket. A cylindrical slit portion 34 near an upper portion of the flat slit forms a rounded bead for snap fitting in a corresponding recess and thus serve as a lock for the pocket.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A novelty sunglasses and information displaying member assembly, comprising, in combination, a pair of sunglasses comprising an eyeglass frame, a pair of sunglass lenses in said frame, and a pair of temple bars pivotally attached to opposite ends of said frame, and a pair of information displaying members having the form of novelty moose antlers attached to said sunglasses, said information displaying members each being substantially flat, elongated in a horizontal direction, and having a thickness in a direction perpendicular to the horizontal direction less than the length of the temple bars, having a medial edge adjacent the glasses, an aperture formed through the thickness of said information displaying members adjacent said medial edge, said temple bars being fitted transversely through said apertures in said information displaying members, whereby said information displaying members project laterally outwardly from the temple bars in a direction perpendicular to the temple bars and in a direction substantially parallel to the lenses when the sunglasses are worn, and adjacent each other with the flat horizontal directions becoming abutting, when the sunglasses are folded up.

2. The combination as set forth in claim 1, wherein each said information displaying member comprises a thick foam rubber pad having a contoured edge in a caricatured shape of a moose antler.

3. The combination as set forth in claim 2, wherein said sun glasses include a head band.

4. The combination as set forth in claim 3, wherein each said information displaying member includes a secret pocket therein.

5. The combination as set forth in claim 4, wherein said pocket includes a pocket lock.

6. The combination as set forth in claim 5, wherein the secret pocket is defined by a slit extending into an edge portion defining the thickness of each information displaying member.

7. The combination as set forth in claim 6, wherein said secret pocket includes a pocket lock defined by a bead and recess of complementary shape defined in the material on respective opposite side portions of the slit by a cylindrical slit port, the bead and recess being releasably engageable as a snap fit reasonably to lock the secret pocket.

8. The combination as set forth in claim 1, and comprising a stiffening rod coupled to each said temple bar and projecting laterally outwardly therefrom and embedded into said information displaying members to retain said information displaying members in an outwardly projecting stiffened orientation.

9. The combination as set forth in claim 1, wherein said information displaying members having advertising markings printed thereon.

10. A novelty sunglasses and secret pocket defining member assembly, comprising, in combination, a pair of sunglasses comprising an eyeglass frame, a pair of sunglass lenses in said frame, and a pair of temple bars pivotally attached to opposite ends of said frame, and a pair of members having the form of novelty moose antlers, at least one of which members defines a secret pocket attached to said sunglasses, each member being substantially flat, elongated in a horizontal direction, and having a thickness in a direction perpendicular to the horizontal direction less than the length of the temple bars, and having a medial edge adjacent the glasses, an aperture formed through the thickness of each member adjacent said medial edge, said temple bars being fitted transversely through said apertures whereby said members project laterally outwardly from the temple bars in a direction perpendicular to the temple bars and in a direction substantially parallel to the lenses when the sunglasses are worn, and adjacent each other with the flat horizontal directions becoming abutting, when the sunglasses are folded up.

11. The combination as set forth in claim 10, wherein the secret pocket is defined by a slit extending into an edge portion defining the thickness of the said at least one pocket defining member.

12. The combination as set forth in claim 11, wherein said secret pocket includes a pocket lock defined by a bead and recess of complementary shape defined in the material on respective opposite side portions of the slit by a cylindrical slit port, the bead and recess being releasably engageable as a snap fit releasably to lock the secret pocket.

13. The combination as set forth in claim 10, wherein said secret pocket includes a pocket lock.

14. The combination as set forth in claim 10, wherein said members have advertising markings printed thereon.

* * * * *